United States Patent
Pratt et al.

(10) Patent No.: US 8,570,158 B2
(45) Date of Patent: Oct. 29, 2013

(54) PROGRAMMING A UNIVERSAL REMOTE CONTROL VIA A POINT-OF-SALE SYSTEM

(75) Inventors: James Pratt, Round Rock, TX (US); Paul Van Vleck, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 712 days.

(21) Appl. No.: 12/541,024

(22) Filed: Aug. 13, 2009

(65) Prior Publication Data

US 2011/0037574 A1 Feb. 17, 2011

(51) Int. Cl.
- *H04Q 5/22* (2006.01)
- *G06G 1/12* (2006.01)
- *G06Q 30/00* (2012.01)
- *G06Q 40/00* (2012.01)
- *G06F 15/16* (2006.01)
- *H04M 1/66* (2006.01)

(52) U.S. Cl.
USPC ......... 340/10.51; 705/21; 705/26.35; 705/39; 705/40; 709/206; 709/219; 455/411

(58) Field of Classification Search
USPC .................................................. 340/825.69
See application file for complete search history.

(56) References Cited

U.S. PATENT DOCUMENTS

| | | | |
|---|---|---|---|
| 5,410,326 A | 4/1995 | Goldstein | |
| 6,735,287 B2 | 5/2004 | Vishik et al. | |
| 6,980,120 B2 | 12/2005 | Yu et al. | |
| 6,989,763 B2 * | 1/2006 | Wall et al. | 340/12.25 |
| 7,046,161 B2 * | 5/2006 | Hayes | 340/12.25 |
| 7,065,184 B2 | 6/2006 | Vishik et al. | |
| 7,093,003 B2 * | 8/2006 | Yuh et al. | 709/219 |
| 7,272,145 B2 | 9/2007 | Chen et al. | |
| 7,415,502 B2 | 8/2008 | Vishik et al. | |
| 7,584,886 B2 * | 9/2009 | Labaton | 235/379 |
| 7,630,478 B2 | 12/2009 | Vishik et al. | |
| 7,653,212 B2 * | 1/2010 | Haughawout et al. | 382/100 |
| 7,746,884 B2 | 6/2010 | Van Vleck et al. | |
| 7,778,263 B2 | 8/2010 | Chen et al. | |
| 7,831,930 B2 * | 11/2010 | Dresti et al. | 715/835 |
| 7,860,962 B2 | 12/2010 | White et al. | |
| 7,873,102 B2 | 1/2011 | Van Vleck et al. | |
| 8,139,164 B2 * | 3/2012 | Hirabayashi et al. | 348/734 |
| 2002/0190956 A1 | 12/2002 | Klein et al. | |
| 2003/0095641 A1 | 5/2003 | Vishik et al. | |
| 2003/0097413 A1 | 5/2003 | Vishik et al. | |
| 2003/0143980 A1 * | 7/2003 | Choi et al. | 455/411 |
| 2004/0010602 A1 | 1/2004 | Van Vleck et al. | |
| 2004/0022247 A1 | 2/2004 | Chen et al. | |
| 2004/0247089 A1 | 12/2004 | Vishik et al. | |
| 2006/0080232 A1 * | 4/2006 | Epps | 705/39 |
| 2006/0203973 A1 | 9/2006 | Vishik et al. | |
| 2006/0251094 A1 | 11/2006 | Van Vleck et al. | |
| 2007/0025449 A1 | 2/2007 | Van Vleck et al. | |
| 2007/0038773 A1 | 2/2007 | White et al. | |
| 2007/0096940 A1 | 5/2007 | Laranang et al. | |
| 2008/0019386 A1 | 1/2008 | Chen et al. | |
| 2008/0189736 A1 | 8/2008 | Edwards et al. | |

(Continued)

*Primary Examiner* — Jennifer Mehmood
*Assistant Examiner* — John Mortell
(74) *Attorney, Agent, or Firm* — Jackson Walker L.L.P.

(57) ABSTRACT

A method and system for programming a universal remote control (URC) to operate with a remote-controlled device is disclosed. In response to an indication of a purchase transaction for a remote-controlled device, a network identity and a device identifier may be sent to client-premises equipment (CPE). The CPE may then program the URC to control the remote-controlled device.

22 Claims, 7 Drawing Sheets

(56) References Cited

U.S. PATENT DOCUMENTS

| | | |
|---|---|---|
| 2008/0235745 A1 | 9/2008 | Edwards et al. |
| 2008/0250468 A1 | 10/2008 | Sullivan et al. |
| 2008/0261514 A1 | 10/2008 | Pratt et al. |
| 2008/0297372 A1* | 12/2008 | Wouters .................. 340/825.69 |
| 2009/0019542 A1 | 1/2009 | Vishik et al. |
| 2009/0021651 A1 | 1/2009 | Pratt et al. |
| 2009/0025025 A1 | 1/2009 | Van Vleck et al. |
| 2009/0031375 A1 | 1/2009 | Sullivan et al. |
| 2009/0067591 A1 | 3/2009 | Belz et al. |
| 2009/0119181 A1 | 5/2009 | Pratt et al. |
| 2009/0125971 A1 | 5/2009 | Belz et al. |
| 2009/0132355 A1 | 5/2009 | Begeja et al. |
| 2009/0157473 A1 | 6/2009 | Belz et al. |
| 2009/0158369 A1 | 6/2009 | Van Vleck et al. |
| 2009/0158373 A1 | 6/2009 | Belz et al. |
| 2009/0180377 A1 | 7/2009 | Sullivan et al. |
| 2009/0187955 A1 | 7/2009 | Sullivan et al. |
| 2009/0245494 A1 | 10/2009 | Sullivan et al. |
| 2009/0288115 A1 | 11/2009 | Belz et al. |
| 2009/0312059 A1 | 12/2009 | Pratt et al. |
| 2009/0319607 A1 | 12/2009 | Belz et al. |
| 2010/0039214 A1 | 2/2010 | Pratt et al. |
| 2010/0039392 A1 | 2/2010 | Pratt et al. |
| 2010/0039393 A1 | 2/2010 | Pratt et al. |
| 2010/0041374 A1 | 2/2010 | Vishik et al. |
| 2010/0042827 A1 | 2/2010 | Pratt et al. |
| 2010/0050270 A1 | 2/2010 | Pratt et al. |
| 2010/0057575 A1 | 3/2010 | Begeja et al. |
| 2010/0058381 A1 | 3/2010 | Begeja et al. |
| 2010/0063863 A1 | 3/2010 | Begeja et al. |
| 2010/0069012 A1 | 3/2010 | Sullivan et al. |
| 2010/0082712 A1 | 4/2010 | Pratt et al. |
| 2010/0088149 A1 | 4/2010 | Sullivan et al. |
| 2010/0104024 A1 | 4/2010 | Sullivan et al. |
| 2010/0113160 A1 | 5/2010 | Belz et al. |
| 2010/0115592 A1 | 5/2010 | Belz et al. |
| 2010/0115607 A1 | 5/2010 | Pratt et al. |
| 2010/0118748 A1 | 5/2010 | Pratt et al. |
| 2010/0121744 A1 | 5/2010 | Belz et al. |
| 2010/0122285 A1 | 5/2010 | Begeja et al. |
| 2010/0122286 A1 | 5/2010 | Begeja et al. |
| 2010/0122306 A1 | 5/2010 | Pratt et al. |
| 2010/0124905 A1 | 5/2010 | Pratt et al. |
| 2010/0125586 A1 | 5/2010 | Van Vleck et al. |
| 2010/0128859 A1 | 5/2010 | Gonzales |
| 2010/0134338 A1 | 6/2010 | Belz et al. |
| 2010/0138499 A1 | 6/2010 | Belz et al. |
| 2010/0138876 A1 | 6/2010 | Sullivan et al. |
| 2010/0144368 A1 | 6/2010 | Sullivan et al. |
| 2010/0145766 A1 | 6/2010 | Begeja et al. |
| 2010/0149982 A1 | 6/2010 | Pratt et al. |
| 2010/0153764 A1 | 6/2010 | Pratt et al. |
| 2010/0153995 A1 | 6/2010 | Belz et al. |
| 2010/0158533 A1 | 6/2010 | Belz et al. |
| 2010/0161801 A1 | 6/2010 | Belz et al. |
| 2010/0162331 A1 | 6/2010 | Belz et al. |
| 2010/0235872 A1 | 9/2010 | Sullivan et al. |
| 2010/0275237 A1 | 10/2010 | Pratt et al. |
| 2010/0289685 A1 | 11/2010 | Pratt et al. |
| 2010/0289954 A1 | 11/2010 | Sullivan et al. |
| 2010/0302057 A1 | 12/2010 | Pratt et al. |
| 2010/0302058 A1 | 12/2010 | Belz et al. |
| 2010/0332979 A1* | 12/2010 | Xu et al. ....................... 715/704 |
| 2011/0012710 A1 | 1/2011 | Sullivan et al. |
| 2011/0037611 A1 | 2/2011 | Van Vleck et al. |
| 2011/0037635 A1 | 2/2011 | Van Vleck et al. |
| 2011/0037637 A1 | 2/2011 | Van Vleck et al. |
| 2011/0047284 A1 | 2/2011 | White et al. |
| 2011/0075727 A1 | 3/2011 | Van Vleck et al. |
| 2011/0090085 A1 | 4/2011 | Belz et al. |
| 2011/0093876 A1 | 4/2011 | Belz et al. |
| 2011/0093908 A1 | 4/2011 | Van Vleck et al. |
| 2011/0095873 A1 | 4/2011 | Pratt et al. |

* cited by examiner

PROGRAMMING A UNIVERSAL REMOTE CONTROL VIA A POINT-OF-SALE SYSTEM

BACKGROUND

1. Field of the Disclosure

The present disclosure relates to remote control devices and, more particularly, to programming universal remote control devices.

2. Description of the Related Art

Remote control devices provide convenient operation of equipment from a distance. Many consumer electronic devices are equipped with remote control features. Universal remote control devices, which may be configured to control different pieces of equipment, are often difficult to reconfigure and reprogram.

DESCRIPTION OF THE EXEMPLARY EMBODIMENTS

Figure 1:
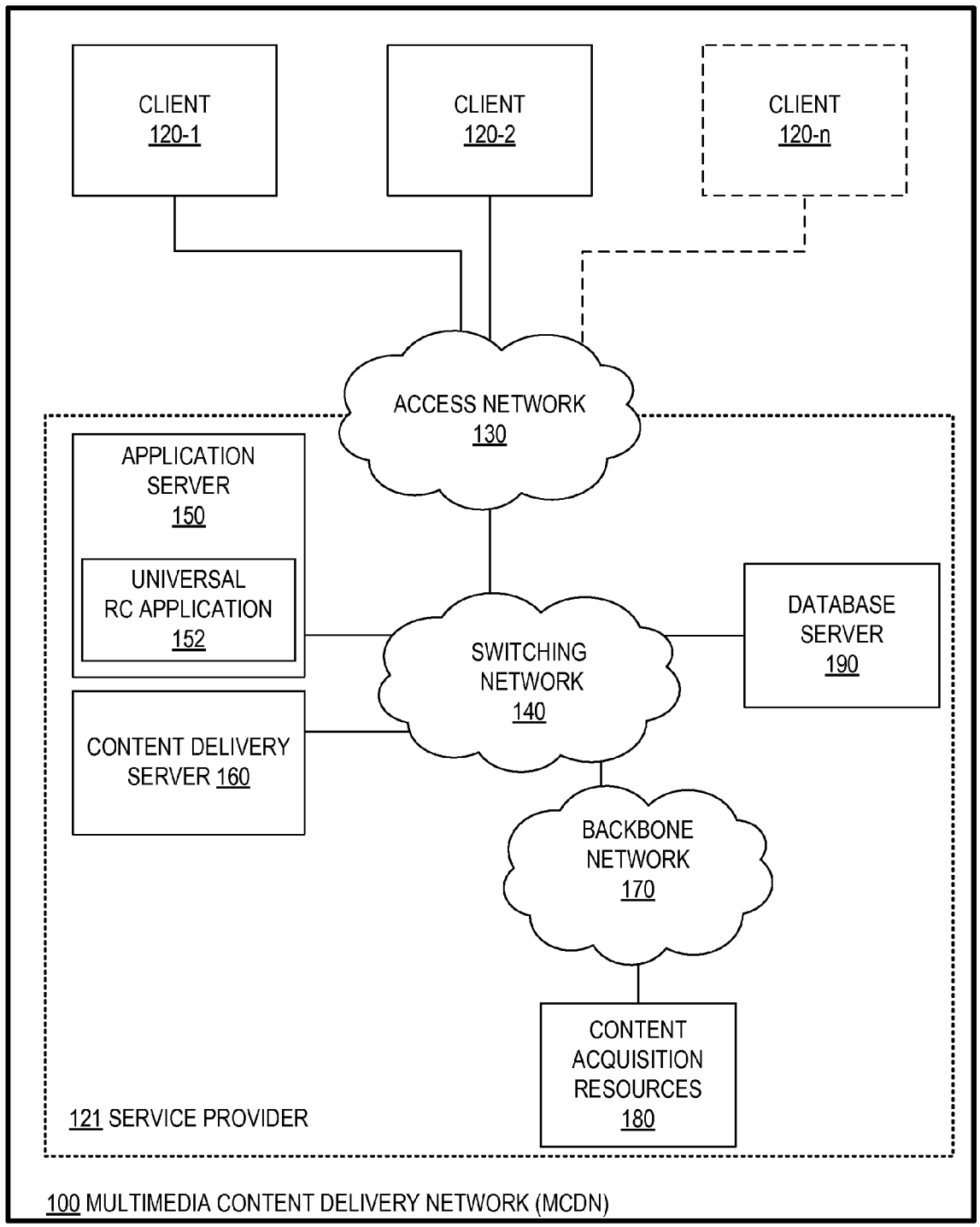
FIG. 1 is a block diagram of selected elements of an embodiment of a multimedia distribution network.

In one aspect, a disclosed computer-implemented method for configuring a universal remote control (URC) includes receiving an indication of a purchase transaction originated by a user for a remote-controlled device, and sending a network identity associated with the user and an identifier for the remote-controlled device to a network server having access to customer premises equipment (CPE) associated with the network identity, wherein the CPE is configured to program a URC to control the remote-controlled device. Sending the network identity may include sending to a network server that is a multimedia content distribution network (MCDN) server, while the MCDN server may access the CPE via the MCDN. The purchase transaction may be originated using a cellular telephony network system. The indication may be a first indication received from a cellular telephone associated with the user, while the receiving may further include receiving a second indication from the cellular telephone that the network identity of the user has been validated by a security procedure, including at least one of: a biometric security procedure, a multimedia security procedure, a voice-recognition security procedure, and a password security procedure. The indication of the purchase transaction may be received from a credit card issuer, while a credit card account associated with the user and the credit card issuer may be used for payment in the purchase transaction. The indication of the purchase transaction may be received from a retailer with which the user performs the purchase transaction. The user may perform the purchase transaction via an online retailing service offered by the retailer. The indication of the purchase transaction may be received from a manufacturer of the remote-controlled device.

In certain embodiments, the method may further include receiving remote control programming codes for the remote-controlled device, and sending the remote control programming codes to the network server. The sending may further include sending an email message, including an instruction for the CPE to program the URC to control the remote-controlled device, to the network server.

In another aspect, a disclosed application server for use within a client configuration of an MCDN may include a processor, and memory media accessible to the processor, including instructions executable by the processor. The instructions may be executable by the processor to receive an indication of a purchase transaction for a remote-controlled device, while the indication may include an MCDN identity associated with a purchaser of the remote-controlled device and an identifier for the remote-controlled device. The instructions may also be executable by the processor to cause CPE associated with the MCDN identity to program a URC to control the remote-controlled device.

In certain embodiments, the processor executable instructions to cause said CPE to program the URC may further include processor executable instructions to send an email message to the CPE. The indication may be received from a point-of-sale system processing the purchase transaction. The point-of-sale system may be operated, at least in part, by a service provider of the MCDN. The application server may further include processor executable instructions to send a message to a user associated with the MCDN identity when the URC has been successfully programmed. The application server may still further include processor executable instructions to send a request to a remote-control (RC) device database, the request including the identifier for the remote-controlled device, for programming codes associated with the remote-controlled device. In response to receiving the programming codes from the RC device database, the processor executable instructions may be executable to send the programming codes to the CPE.

In yet another aspect, a disclosed computer-readable memory media includes executable instructions for configuring a URC over an MCDN. The instructions may be executable to receive an indication of a purchase transaction for a remote-controlled device, while the indication may include an MCDN identity associated with a user and an identifier for the remote-controlled device. The indication may be received from a point-of-sale system processing the purchase transaction. The point-of-sale system is operated at least in part by the service provider of the MCDN. The instructions may further be executable to send a command to CPE associated with the MCDN identity to program a URC to control the remote-controlled device, while the command may include an indication of the MCDN identity and the identifier for the remote-controlled device. The instructions to send a command may further include instructions executable to send an email message to the CPE and display the message on a display device coupled to the CPE.

In some embodiments, the memory media may further include instructions executable to send a request to an RC device database for programming codes associated with the remote-controlled device, receive the programming codes from the RC device database, and forward the programming codes to the CPE. The request may include the identifier for the remote-controlled device. The memory media may yet further include instructions executable to receive a confirmation from the CPE that the URC has been successfully configured to control the remote-control device, and send a message to the user indicating that the URC has been successfully programmed.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs".

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital subscribe line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include URC application 152, which, as will be described in detail below, may be configured to cause client 120 of MCDN 100 to reprogram a URC device.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, and programming codes for URCs.

Figure 2:
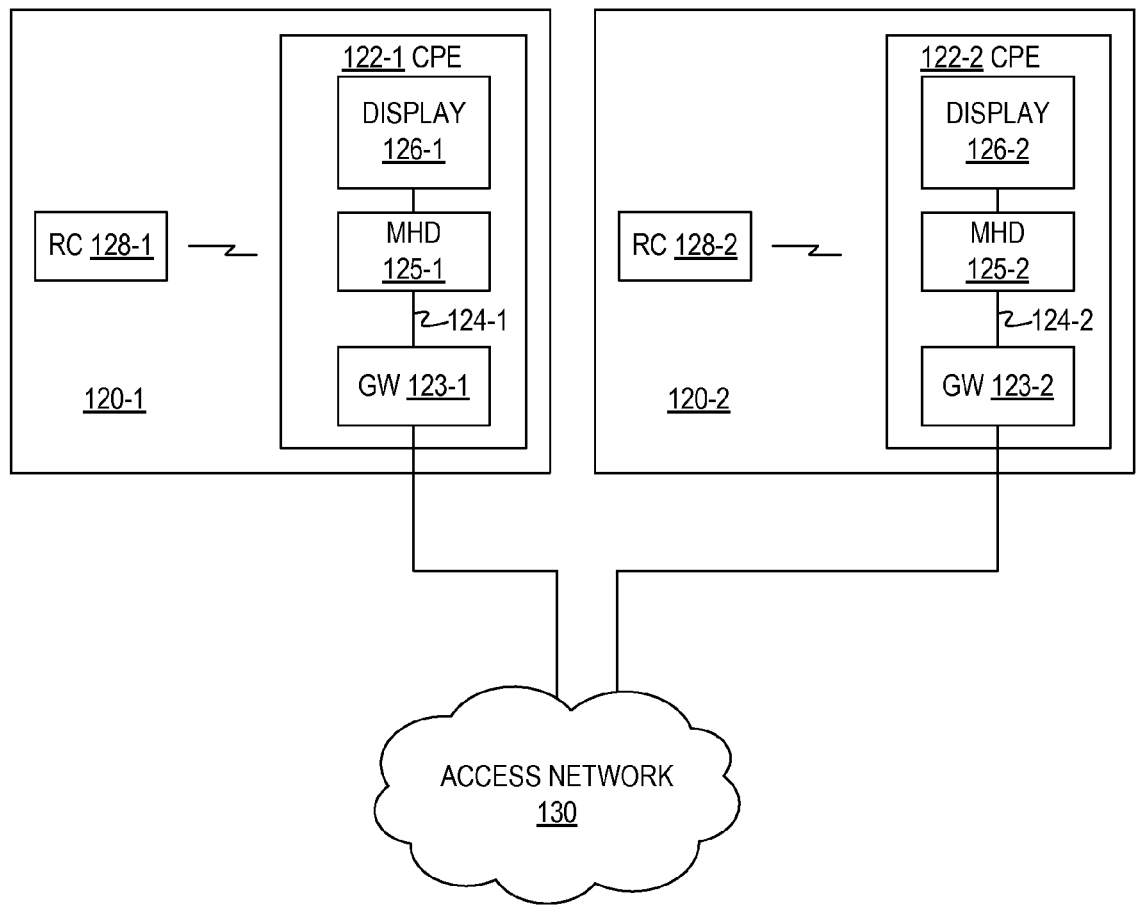
FIG. 2 is a block diagram of selected elements of an embodiment of a multimedia distribution network.

Turning now to FIG. 2, clients 120 are shown in additional detail with respect to access network 130. Clients 120 may include a network appliances collectively referred to herein as CPE 122. In the depicted embodiment, CPE 122 includes the following devices: gateway (GW) 123, multimedia handling device (MHD) 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with a respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125.

In some embodiments, remote control 128 may represent a URC device that is configured to control multiple pieces of equipment. When the equipment controlled by the URC device changes, the URC device may be reprogrammed, for example, to add a new device. The URC device may be programmed using a local transceiver (see FIG. 3) coupled to CPE 122. In some cases, CPE 122 may receive network commands to reprogram the URC device, as will be described in detail below.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a stand-alone set top box suitable for use in a co-axial or IP-based multimedia content delivery network.

Figure 3:
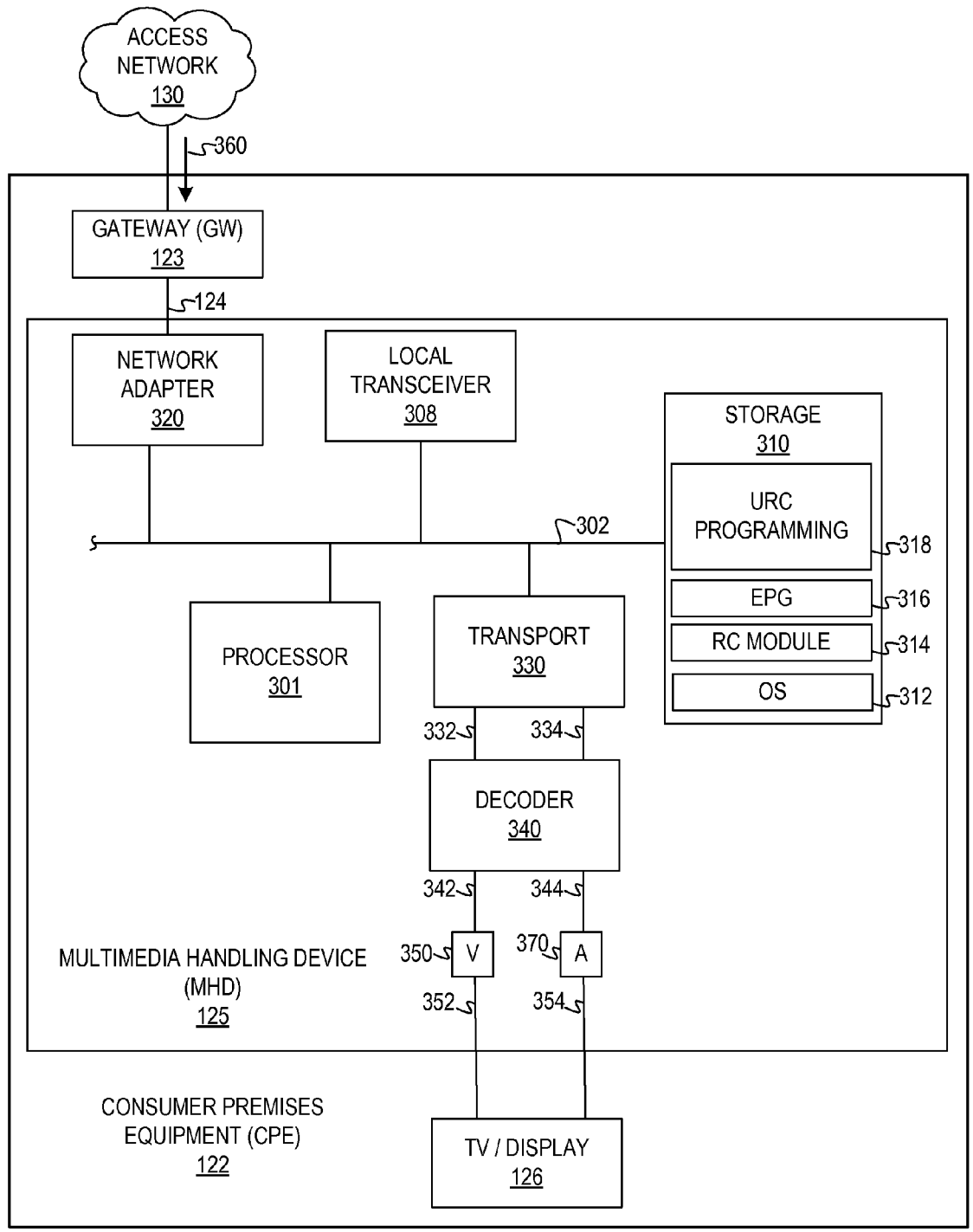
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP based content delivery networks, MHD 125, as depicted in FIG. 3, may include transport unit 330 that assembles the payloads from a sequence or set of network packets into a stream of multimedia content. In coaxial based access networks, content may be delivered as a stream that is not packet based and it may not be necessary in these embodiments to include transport unit 330. In a co-axial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown may include sets or sequences of instructions, namely, an operating system 312, a remote control application program identified as RC module 314, an EPG 316, and URC programming 318. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

EPG 316 represents a guide to the multimedia content provided to client 120 via MCDN 100, and may be shown to the user as an element of the user interface. The user interface may include a plurality of menu items arranged according to one or more menu layouts, which enable a user to operate MHD 125. The user may operate the user interface, including EPG 316, using remote control 128 (see FIG. 2) in conjunction with RC module 314. In some embodiments, URC application 152 (see FIG. 1), in conjunction URC programming 318, provides functionality to reprogram or reconfigure a URC device, as will be described in further detail below.

Local transceiver 308 represents an interface of MHD 125 for communicating with external devices, such as remote control 128, or another URC device. Local transceiver 308 may provide a mechanical interface for coupling to an external device, such as a plug, socket, or other proximal adapter. In some cases, local transceiver 308 is a wireless transceiver, configured to send and receive IR or RF or other signals. A URC device configured to operate with CPE 122 may be reconfigured or reprogrammed using local transceiver 308. In some embodiments, local transceiver 308 is also used to receive commands for controlling equipment from the URC device. Local transceiver 308 may be accessed by RC module 314 for providing remote control functionality.

Figure 4:
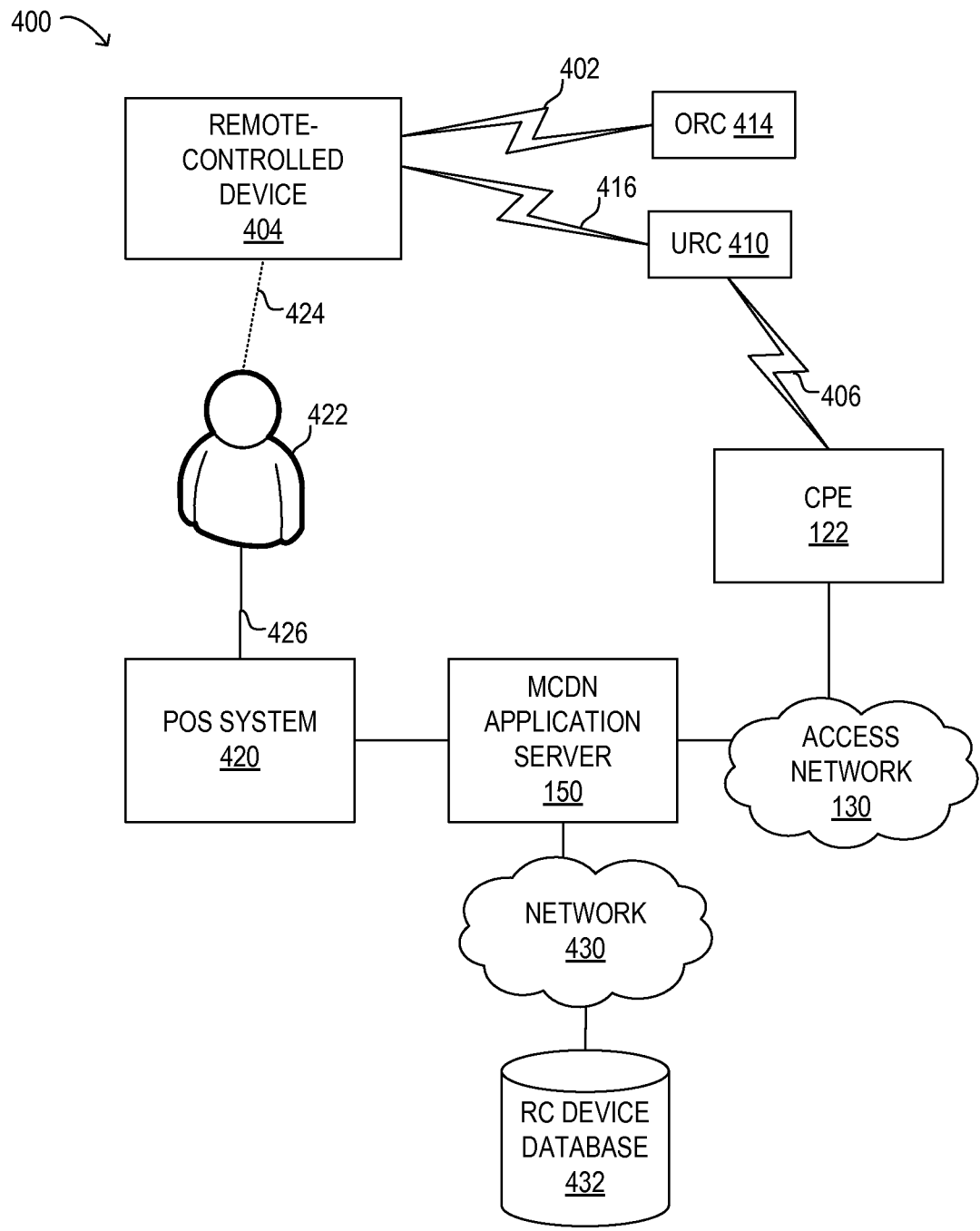
FIG. 4 is a block diagram of selected elements of an embodiment of a universal remote control system.

Turning now to FIG. 4, a block diagram of selected elements of an embodiment of URC system 400 is depicted. In URC system 400, original remote control (ORC) 414, URC 410, and CPE 122 may be in proximity to remote-controlled device 404, for example at a location of an MCDN client 120 (not shown in FIG. 4). URC system 400 illustrates devices, interfaces and information that may be processed to program URC 410 to control remote-controlled device 404. The reconfiguring, or reprogramming, of URC 410 may be complex, error prone, or time-consuming for a user. URC system 400 is a platform that may allow a user to reprogram URC 410 using services provided by MCDN 100. It is noted that in FIG. 4, communication links 402, 406, and 416 may be wireless or mechanically connected interfaces. It is further noted that like numbered elements in FIG. 4 represent components discussed above with respect to FIGS. 1-3.

In FIG. 4, remote-controlled device 404 may refer to a piece of equipment that is introduced for use with or near CPE 122. In some embodiments, remote-controlled device 404 may be controllable by remote control, and may be suitable for control by URC 410. Remote-controlled device 404 may also represent an existing instrument or device that is in use, but not yet controllable using URC 410, because URC 410 may not yet be configured to control remote-controlled device 404. Remote-controlled device 404 may further include one or more local transceivers or interfaces (not explicitly shown in FIG. 4) for communicating with remote controls, or for control by another piece of equipment, as will be described below.

ORC 414 may be a remote control that is dedicated for operation with remote-controlled device 404, for example, via communication link 402. That is, ORC 414 may represent original equipment provided with remote-controlled device 404, such that remote-controlled device 404 and ORC 414 may communicate via communication link 402 as a stand-alone unit. ORC 414 may be configured to use codes, or coded instructions, that are specific to remote-controlled device 404. ORC 414 may further be specific to a device-type (i.e., model, configuration, etc.) corresponding to remote-controlled device 404, such that ORC 414 may be operable with any manufactured instance of a particular device model, represented by remote-controlled device 404.

In some cases remote-controlled device 404 may be coupled to CPE 122 (not shown in FIG. 4). The coupling to CPE 122 may be subordinate in nature, such that remote-controlled device 404 may be controlled by CPE 122 in response to commands or signals received by local transceiver 308 (see FIG. 3). It is noted that such a coupling is optional and may be omitted in certain embodiments.

In FIG. 4, URC 410 may communicate with CPE 122 via communication link 406. Communication link 406 may be used to receive remote-control commands (i.e., in the form of codes or instructions) from URC 410. Alternatively, communication link 406 may be used to reprogram (i.e., reconfigure) URC 410 to send different commands or to control different equipment. For example, communication link 406 may be used to reconfigure URC 410 to use programming codes corresponding to remote-controlled device 404. In some instances, communication link 406 may be used to limit or delete existing functionality, for which URC 410 may be configured.

In FIG. 4, after URC 410 has been configured with at least some programming codes corresponding to remote-controlled device 404, URC 410 may communicate via communication link 416 with remote-controlled device 404. That is, URC 410 may emulate at least some functionality using communication link 416 that ORC 414 is capable of using via communication link 402. From the perspective of remote-controlled device 404, communication links 402 and 416 may appear identical or indistinguishable. In other words, remote-controlled device 404 may not be aware that URC 410 is emulating ORC 414, and may respond to communication links 402 or 416 in an identical manner.

It is particularly noted that in URC system 400, different pathways for URC 410 to control remote-controlled device 404 may exist. A first pathway is communication link 416, which represents direct control of remote-controlled device 404 by URC 410, without intervention from CPE 122. A second pathway may exist via CPE 122, using communication link 406 and a coupling between CPE 122 and remote-controlled device 404 (not shown in FIG. 4). In this configuration, URC 410 may directly communicate with CPE 122 via communication link 406, for example, using local interface 308 (see FIG. 3). CPE 122 may then relay or forward an instruction received by URC 410 to remote-controlled device 404 using the coupling. The coupling may represent an interface with its own command set that is different from the actual command set used by ORC 414 via communication link 402.

In FIG. 4, CPE 122 may communicate with MCDN application server 150 via access network 130. Access network 130 may represent a "last-mile" access network providing service to a large number of MCDN client systems (see FIGS. 1-3). Access network 130 may include routers configured to forward network commands to CPE for performing certain actions, such as programming URCs. The network commands may be received in the form of an email message addressed to the CPE. MCDN application server 150 may, in turn, communicate with external systems using network 430, for example, with RC device database 432. As illustrated in FIG. 4, MCDN application server 150 may retrieve RC device information from RC device database 432 over network 430. Network 430 may be a public or private network, while RC device database 432 may be operated by an external business entity, or may be provided by a third-party. RC device database 432 may include device information for a variety of different RC devices, which may be controllable by URC 410. The RC device information may include programming codes for specific RC devices. Thus, MCDN application server may 150 may query RC device database 432, in one embodiment, using a model identifier to retrieve programming codes for remote-controlled device 404. It is noted that in different embodiments (not shown in FIG. 4) RC device database 432 may be included as an internal component of MCDN application server 150, and may be accessed directly using network 430 or another network. After obtaining or retrieving the desired programming codes, MCDN application server 150, executing URC application 152 (see FIG. 1), may send the programming codes back to CPE 122.

As shown in FIG. 4, MCDN application server 150 may further communicate with point-of-sale (POS) system 420. POS system 420 may represent any of a number of systems or interfaces for purchasing remote-controlled device 404 (see also FIG. 5). In particular, MCDN application server 150 may receive an indication from POS system 420 that an instance of remote-controlled device 404 has been purchased and may further receive from POS system 420 an MCDN network identity associated with CPE 122. In various embodiments, receipt of such notification by MCDN application server 150 may cause MCDN application server 150, in conjunction with CPE 122, to reprogram URC 410 to control remote-controlled device 404. It is noted that in URC system 400, operations to reprogram URC 410 may be initiated as soon as a purchase transaction has been registered by POS system 420, and may not depend upon a physical location or presence of remote-controlled device 404.

In FIG. 4, user 422 may interact via link 426 with POS system 420 for purchasing remote-controlled device 404. Link 426 may represent any of a variety of types of interaction for performing a purchase transaction for remote-controlled device 404, including human interaction with a sales agent and/or machine interactions with automated systems. In one embodiment, link 426 may represent a physical interaction, i.e., a visitation by user 422, at a retail outlet offering remote-controlled device 404 for sale. In certain embodiments, link 426 may represent a voice conversation with an entity offering remote-controlled device 404 for sale via an audio connection, such as a telephone call. In other embodiments, link 426 may represent user interaction at an Internet website offering remote-controlled device 404 for sale. The interaction represented by link 426 may include obtaining product information, negotiating a purchase price, and performing the purchase transaction (including tendering a method of payment), and arranging for delivery. Accordingly, POS system 420 may be configured to provide various functionality for sales and processing of purchasing transactions, and may be configured to contact external entities (not shown in FIG. 4) therefor (see also FIG. 5). Also shown in FIG. 4 is link 424, which represents ownership, or possession, of remote-controlled device 404 by user 422, who may be associated with an MCDN network identity associated with CPE 122.

In operation of URC system 400, as shown in FIG. 4, user 422 may initiate a purchase transaction via link 426 with POS system 420. In response, POS system 420 may initiate a URC configuration request to MCDN application server 150 for configuring URC 410 to control remote-controlled device 404. The URC configuration request may include a device attribute, or a device identifier, of remote-controlled device 404 along with an MCDN identity associated with CPE 122. MCDN application server 150 may then send at least one programming code for remote-controlled device 404 to CPE 122 in response to receiving the URC configuration request. In certain embodiments, MCDN application server 150 may obtain programming codes for remote-controlled device 404 via network 430 from RC device database 432. CPE 122 may then program URC 410 to control remote-controlled device 404. A notice may then be sent back to user 422 that URC 410 has been programmed to control remote-controlled device 404. An advantage to URC system 400 according to the operations described herein, is that, by the time remote-controlled device 404 is introduced into a location associated with CPE 122, remote-controlled device 404 may already be configured for use with URC 410 and may not require any additional actions on the part of user 422, or another operator associated with CPE 122.

After URC 410 has been programmed, or reprogrammed, CPE 122 may receive a confirmation via communication link 406, and may display an indication that URC 410 has been successfully configured to control remote-controlled device 404. In some cases, CPE 122 may transmit the confirmation/indication of successful URC configuration to MCDN application server 150, which may, in turn, send a confirmation to another device, such as a user mobile communications device, originating the URC configuration request.

After being successfully configured, URC 410 may control remote-controlled device 404. In one embodiment, URC 410 may use communication link 416 to directly control remote-controlled device 404.

Figure 5:
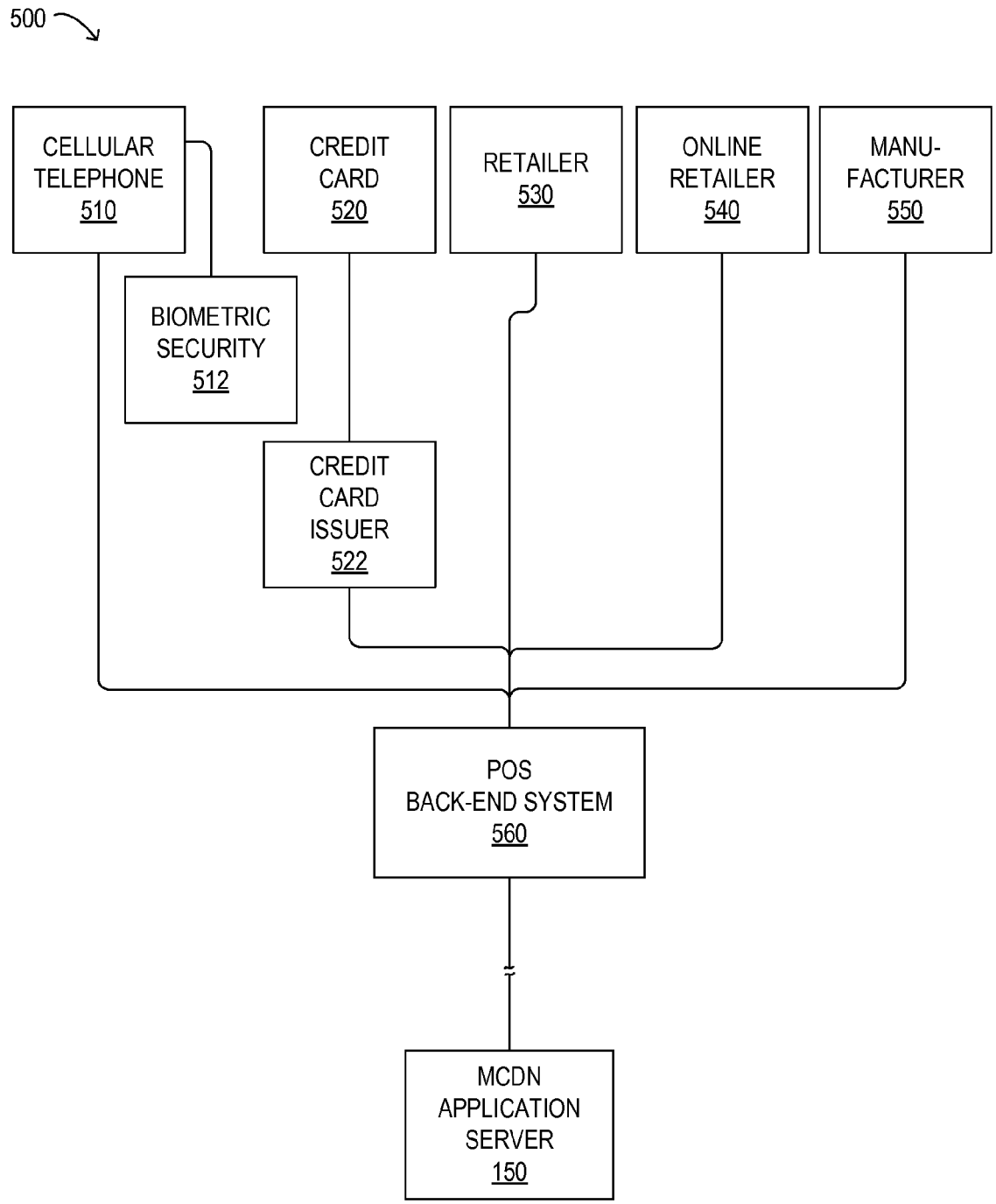
FIG. 5 is a block diagram of selected elements of an embodiment of a point-of-sale system.

Turning now to FIG. 5, selected elements of an embodiment of POS system 500, along with MCDN application server 150, are depicted. Elements depicted in POS system 500 may represent an embodiment of POS system 420 (see FIG. 4). It is noted that certain elements in POS system 500 may represent functionality and/or services provided by different business entities involved with a purchase transaction. It is further noted that, in various embodiments, connections between elements of POS system 500 may be different, and in particular more complex, than depicted for clarity in FIG. 5.

In FIG. 5, POS system 500 includes POS back-end system 560, which may represent various transaction processing and communications infrastructure. POS back-end system 560 may be configured to facilitate a purchase transaction between a user (not shown in FIG. 5) and a vendor using a number of possible purchasing means. POS back-end system 560 may be configured to receive an indication of a purchase transaction, including additional information associated with the purchase transaction, such as an identity of the purchaser, or an identifier of the purchased product. POS back-end system 560 may further be configured to communicate, or notify, MCDN application server 150 of the purchase transaction, along with the additional information associated therewith.

As shown in FIG. 5, cellular telephone 510 may be used as a front-end POS system. In other words, a user may initiate and complete a purchase transaction using cellular telephone 510. The purchase transaction may be communicated to POS back-end system 560 via voice, data or multimedia data messages from cellular telephone 510. In certain embodiments, an identifier for cellular telephone 510 may be used to verify the identity of a user operating cellular telephone 510. In particular instances, cellular telephone 510 may be coupled to biometric security 512, which may provide a biometric means of verifying, or establishing, an identity of an operator of cellular telephone 510. POS back-end system 560 may be configured to respond to a particular implementation of biometric security 512.

The communication between cellular telephone 510 and POS back-end system 560 may include a wireless interface, but may also include fixed network interfaces between cellular telephony equipment (not shown in FIG. 5) and POS back-end system 560. In certain embodiments, an operator of a cellular telephony network (not shown in FIG. 5) providing service to cellular telephone 510 may be the same entity operating MCDN network 100, such as service provider 121 (see FIG. 1).

Continuing with FIG. 5, a user may use credit card 520 to access an account with credit card issuer 522 for performing a purchase transaction. Credit card 520 may also represent a credit account number that may be used to access the credit services of credit card issuer 522, such as providing payment for the remote-controlled device. Credit card issuer 522 may then report information associated with the purchase transaction to POS back-end system 560. Also shown in FIG. 5 is retailer 530 representing a retail establishment where merchandise is offered for sale and made immediately available to the purchaser. In FIG. 5, online retailer 540 represents an electronic purchasing service, such as an Internet website, which offers purchase transactions and shipping of merchandise. In certain embodiments, online retailer 540 may also provide retail services using cellular telephone 510. Online retailer 540 may further be associated with retailer 530, or may represent a service provided by retailer 530. Finally, manufacturer 550 may represent an entity producing goods for sale, such as remote-controlled device 404 (see FIG. 4). In particular embodiments, manufacturer 550 may be notified of a purchase of one of their own products, for example by credit card 520, retailer 530, or online retailer 540, and then subsequently notify POS back-end system 560 of the purchase transaction, along with additional information associated therewith.

Thus, in POS system 500, any of cellular telephone 510, credit card 520, retailer 530, online retailer 540, and manufacturer 550, may serve as a front-end POS element, either singly or in combination. The front-end POS element may notify the POS back-end system 560 that remote-controlled device 404 has been purchased by a particular individual, i.e., a purchaser. The front-end POS element may also provide POS back-end system 560 with an identity, such as a network identity, for the purchaser. In certain embodiments, the network identity may be an MCDN network identity. POS back-end system 560 may then forward a notification of the purchase, along with the network identity of the purchaser and an identifier for remote-controlled device 404, to MCDN application server 150.

Figure 6:
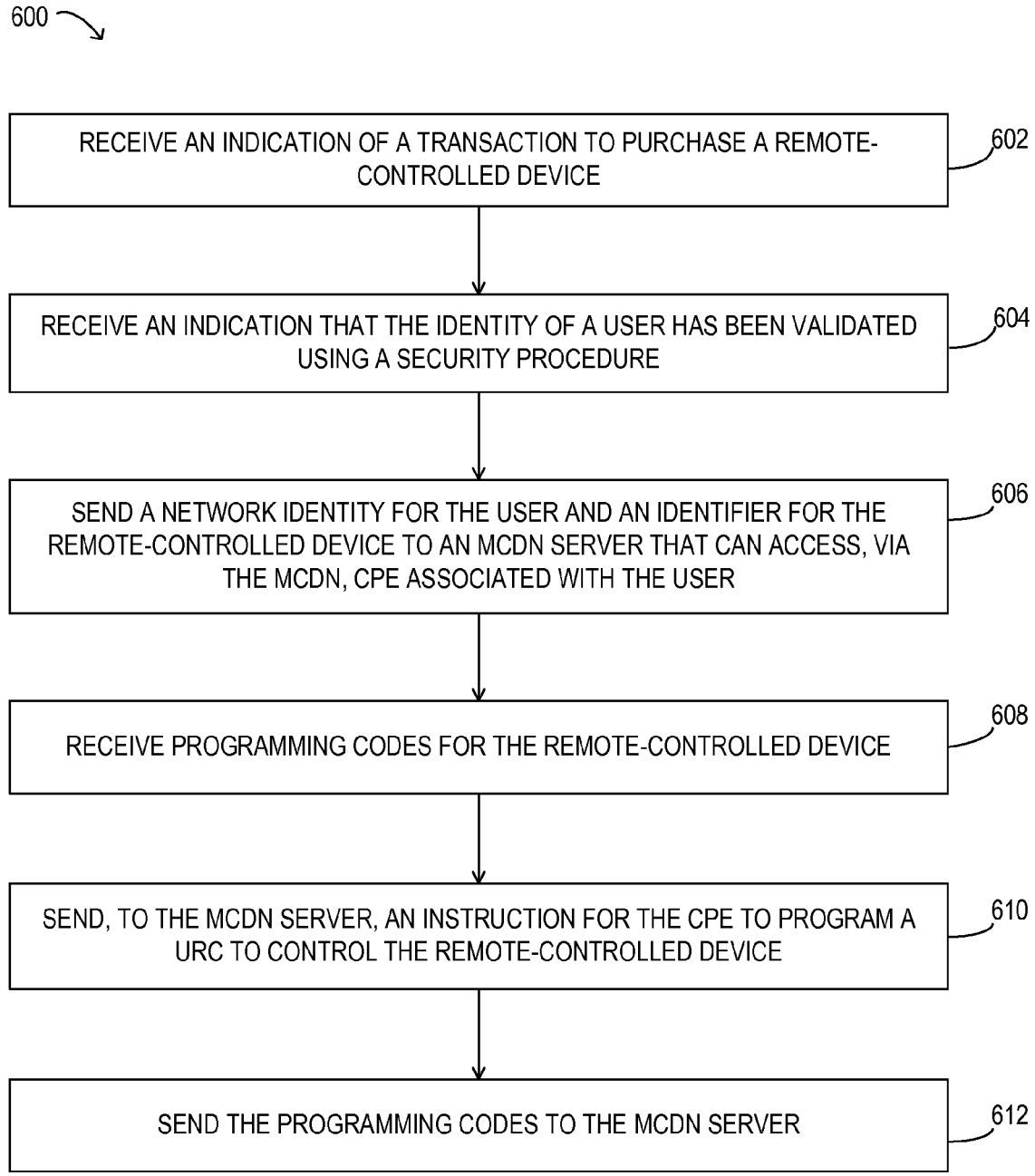
FIG. 6 illustrates an embodiment of a method for programming a universal remote control.

Turning now to FIG. 6, an embodiment of method 600 for programming a universal remote control is illustrated. In one embodiment, method 600 may be executed by POS system 420 (see FIG. 4). It is noted that certain operations described in method 600 may be optional or may be rearranged in different embodiments. In method 600, it is assumed that URC 410 is capable of controlling remote-controlled device 404 (see FIG. 4).

An indication of a transaction to purchase a remote-controlled device may be received (operation 602). The indication may be received from any one of a number of POS front-end systems. A user associated with an MCDN account and an MCDN network identity may initiate the purchase as a purchaser of the remote-controlled device. An indication is received that the identity of a user has been validated using a security procedure (operation 604). In one example, the security procedure may involve biometric security 512 in conjunction with a mobile device, such as cellular telephone 510 (see FIG. 5). Other security procedures may include at least one of: a multimedia security procedure, a voice-recognition security procedure, and a password security procedure. A network identity for the user and an identifier for the remote-controlled device may be sent to an MCDN server that can access, via the MCDN, CPE associated with the user (operation 606). The network identity may be an MCDN identity and the user may be associated with an MCDN user account linked to the CPE. Programming codes for the remote-controlled device may be received (operation 608). The programming codes may be received from a manufacturer of the remote-controlled device. An instruction for the CPE to program a URC to control the remote-controlled device may be sent to the MCDN server (operation 610). The instruction may be in the form of an email message that may designate the CPE as the recipient. The programming codes may then be sent to the MCDN server (operation 612). The MCDN server may forward the programming codes to the CPE, which may use these to program the remote-controlled device.

Figure 7:
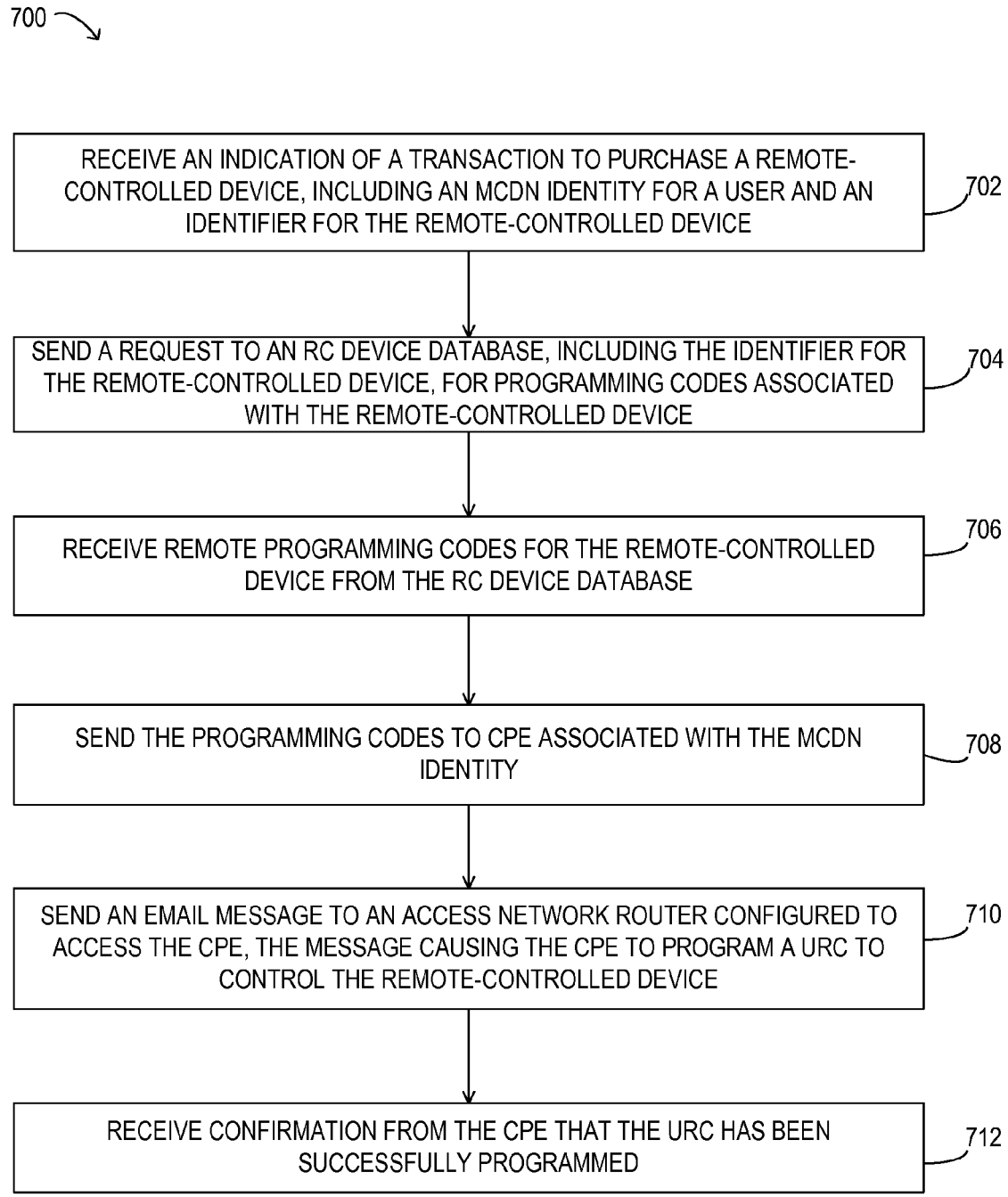
FIG. 7 illustrates an embodiment of a method for programming a universal remote control.

Turning now to FIG. 7, an embodiment of method 700 for programming a URC is illustrated. In one embodiment, method 700 may be performed by URC application 152 executing on application server 150. Method 700 may also be performed in conjunction with functionality provided by a client device on the MCDN, such as URC programming 318 executing on MHD 125 of CPE 122. It is noted that certain operations described in method 700 may be optional or may be rearranged in different embodiments. In method 700, it is assumed that URC 410 is capable of controlling remote-controlled device 404 (see FIG. 4).

An indication of a transaction to purchase a remote-controlled device, including an MCDN identity for a user and an identifier for the remote-controlled device is received (operation 702). The user may be a purchaser of the remote-controlled device. A request may be sent to an RC device database, including the identifier for the remote-controlled device, for programming codes associated with the remote-controlled device (operation 704). The request may represent a query of the RC device database for the programming codes. Programming codes for the remote-controlled device may be received from the RC device database (operation 706). The programming codes may be sent to CPE associated with the MCDN identity (operation 708). An email message to an access network router configured to access the CPE may be sent, the message causing the CPE to program a URC to control the remote-controlled device (operation 710). The CPE may display an indication of the email message on a display device coupled to the CPE. The message may be displayed by the CPE during programming of the URC by the CPE. A confirmation may be received from the CPE that the URC has been successfully programmed (operation 712). The confirmation may be forwarded to the user purchasing the remote-controlled device. In one embodiment, the CPE may display a confirmation message on a display device coupled to the CPE.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A computer-implemented remote control programming method, comprising:
  responsive to receiving a transaction indication indicative of a purchase transaction, originated by a user, for a remote-controlled device, programming a universal remote control, wherein the programming includes:
    sending a network identity associated with the user and an identifier of the remote-controlled device to a network server having access to customer premises equipment associated with the network identity;
    receiving a validation indication indicating that that the network identity of the user has been validated by a biometric security procedure;
    receiving programming codes for the remote-controlled device from the network server;
    providing the programming codes to the customer premises equipment; and
    configuring the universal remote control to execute the programming codes to control the remote-controlled device;
    wherein the configuring of the universal remote control initiates as soon as the transaction indication is received and regardless of whether the remote-controlled device and the universal remote control are in proximity to one another.

2. The method of claim 1, wherein sending the network identity includes sending to a multimedia content distribution network server in communication with the customer premises equipment via the multimedia content distribution network.

3. The method of claim 1, wherein receiving the transaction indication includes receiving the transaction indication from a cellular telephone associated with the user.

4. The method of claim 1, wherein the purchase transaction is originated using a cellular telephony network.

5. The method of claim 1, wherein a credit card account associated with the user and a credit card issuer is used to pay for the purchase transaction and wherein the transaction indication is received from a credit card issuer.

6. The method of claim 1, wherein the transaction indication is received from a retailer associated with the purchase transaction.

7. The method of claim 6, wherein the user performs the purchase transaction via an online retailing service offered by the retailer.

8. The method of claim 1, wherein the transaction indication is received from a manufacturer of the remote-controlled device.

9. The method of claim 1, wherein:
  configuring the universal remote control includes configuring the universal remote control to provide the programming codes to the remote-controlled device directly.

10. The method of claim 1, wherein:
  configuring the universal remote control includes configuring the universal remote control to provide the programming codes to the remote-controlled device indirectly, via the customer premises equipment.

11. An application server, comprising:
  a processor; and
  a non-transitory computer readable medium including stored, processor executable instructions that, when executed by the processor, cause the processor to perform operations comprising:
    programming a universal remote control in response to receiving a transaction indication indicative of a purchase transaction, originated by a user, for a remote-controlled device, wherein the programming includes:
      sending a network identity associated with the user and an identifier of the remote-controlled device to a network server having access to customer premises equipment associated with the network identity;
      receiving a validation indication indicating that that the network identity of the user has been validated by a biometric security procedure;
      receiving programming codes for the remote-controlled device from the network server;
      providing the programming codes to the customer premises equipment; and
      configuring the universal remote control to execute the programming codes to control the remote-controlled device; and
      wherein the configuring of the universal remote control initiates as soon as the transaction indication is received and regardless of whether the remote-controlled device and the universal remote control are in proximity to one another.

12. The application server of claim 11, wherein sending the network identity includes sending to a multimedia content distribution network server in communication with the customer premises equipment via the multimedia content distribution network.

13. The application server of claim 11, wherein the transaction indication is received from a point-of-sale system processing the purchase transaction.

14. The application server of claim 13, wherein the point-of-sale system is operated by a service provider of the multimedia content distribution network.

15. The application server of claim 11, wherein the operations include: notifying the user when the universal remote control has been successfully programmed.

16. The application server of claim 11, wherein the operations include:
  sending a request to a remote-controlled device database, the request including the identifier for the remote-controlled device, for programming codes associated with the remote-controlled device.

17. A non-transitory computer readable medium including stored, processor executable instructions that, when executed by a processor, cause the processor to perform operations comprising:
  programming a universal remote control in response to receiving a transaction indication indicative of a purchase transaction, originated by a user, for a remote-controlled device, wherein the programming includes:
    sending a network identity associated with the user and an identifier of the remote-controlled device to a network server having access to customer premises equipment associated with the network identity;
    receiving a validation indication indicating that that the network identity of the user has been validated by a biometric security procedure;
    receiving programming codes for the remote-controlled device from the network server; and
    providing the programming codes to the customer premises equipment; and
    configuring the universal remote control to execute the programming codes to control the remote-controlled device;
    wherein the configuring of the universal remote control initiates as soon as the transaction indication is received and regardless of whether the remote-controlled device and the universal remote control are in proximity to one another.

18. The computer readable medium of claim 17, wherein sending the network identity includes sending to a multimedia content distribution network server in communication with the customer premises equipment via the multimedia content distribution network.

19. The computer readable medium of claim 17, wherein the transaction indication is received from a point-of-sale system processing the purchase transaction.

20. The computer readable medium of claim 17, wherein the point-of-sale system is operated by a service provider of the multimedia content distribution network.

21. The computer readable medium of claim 17, wherein the transaction indication is received from a point-of-sale system processing the purchase transaction and wherein the point-of-sale system is operated by a service provider of the multimedia content distribution network.

22. The computer readable medium of claim 17, wherein the operations include:

notifying the user when the universal remote control has been successfully programmed.

\* \* \* \* \*